US009369166B1

(12) United States Patent
Simnacher

(10) Patent No.: US 9,369,166 B1
(45) Date of Patent: Jun. 14, 2016

(54) EARPIECE ATTACHMENT FOR USE WITH A CELL PHONE

(71) Applicant: Larry W. Simnacher, Bay City, TX (US)

(72) Inventor: Larry W. Simnacher, Bay City, TX (US)

( * ) Notice: Subject to any disclaimer, the term of this patent is extended or adjusted under 35 U.S.C. 154(b) by 134 days.

(21) Appl. No.: 14/283,741

(22) Filed: May 21, 2014

Related U.S. Application Data

(60) Provisional application No. 61/825,761, filed on May 21, 2013.

(51) Int. Cl.
| | | |
|---|---|---|
| *H04R 25/02* | (2006.01) | |
| *H04M 1/17* | (2006.01) | |
| *H04M 1/19* | (2006.01) | |
| *H04M 1/02* | (2006.01) | |
| *H04B 1/3827* | (2015.01) | |
| *H04R 25/00* | (2006.01) | |

(52) U.S. Cl.
CPC ........... *H04B 1/3838* (2013.01); *H04M 1/0202* (2013.01)

(58) Field of Classification Search
USPC .......... 181/129, 130, 135, 128, 137; 381/328, 381/380, 383; 379/428.02, 428.04; 220/8
See application file for complete search history.

(56) References Cited

U.S. PATENT DOCUMENTS

| | | | | | |
|---|---|---|---|---|---|
| 793,436 | A | * | 6/1905 | Green .................. | H04R 1/1008 181/129 |
| 1,624,144 | A | * | 4/1927 | Mathieu ............... | H04R 1/1016 181/129 |
| 2,544,027 | A | * | 3/1951 | King ..................... | H04M 1/03 379/52 |
| 2,847,506 | A | * | 8/1958 | Gray ..................... | H04M 1/62 379/443 |
| 4,556,121 | A | * | 12/1985 | Palmaer ................ | A42B 3/30 181/129 |
| 4,596,899 | A | * | 6/1986 | Wojcik ................. | H04M 1/2155 379/52 |
| 4,823,384 | A | * | 4/1989 | Lindsay ............... | H04M 1/2475 379/441 |
| 4,864,611 | A | * | 9/1989 | Helmuth ............... | H04M 1/20 379/444 |
| 4,924,502 | A | * | 5/1990 | Allen .................... | A42B 3/166 181/129 |
| D320,799 | S | * | 10/1991 | Holt ..................... | 379/447 |
| 5,298,692 | A | | 3/1994 | Ikeda et al. | |
| D359,960 | S | * | 7/1995 | Kennedy et al. ...... | D14/240 |
| 5,564,085 | A | * | 10/1996 | Chen .................... | H04B 1/3833 455/117 |
| 6,021,195 | A | * | 2/2000 | Brawne ................. | H04M 1/03 379/433.02 |

(Continued)

*Primary Examiner* — Edgardo San Martin
(74) *Attorney, Agent, or Firm* — Egbert Law Offices, PLLC

(57) ABSTRACT

An earpiece attachment for use with a cell phone has a body with a first end of the second end with a hole formed therethrough, and a trumpet affixed to the body in a location over a hole of the body. The first and second ends are suitable for engaging a surface of the cell phone. The body has a length suitable for extending across a width of the cell phone. The trumpet is movable between a retracted position and an extended position. The extended position is suitable for extending into or adjacent to an ear canal of the user. A resilient member is fitted within the trumpet so as to urge the trumpet toward the extended position. A lock is affixed to the body and is suitable for maintaining the trumpet in the retracted position.

19 Claims, 3 Drawing Sheets

(56) References Cited

U.S. PATENT DOCUMENTS

| | | | | |
|---|---|---|---|---|
| 6,411,722 B1* | 6/2002 | Wolf | | H04R 1/1058 381/370 |
| 6,775,390 B1* | 8/2004 | Schmidt | | H04M 1/05 181/128 |
| D505,132 S * | 5/2005 | Linville | | D14/223 |
| 6,914,996 B2* | 7/2005 | Takeda | | H04M 1/72591 381/374 |
| 7,068,782 B2* | 6/2006 | Mueller | | H04M 1/03 379/433.02 |
| 7,539,302 B2* | 5/2009 | Kulas | | H04M 1/0258 379/420.02 |
| 8,121,334 B2* | 2/2012 | Tsai | | H04M 1/05 381/374 |
| 8,213,643 B2* | 7/2012 | Hemer | | H04R 17/00 381/151 |
| 8,254,621 B2 | 8/2012 | Silvestri et al. | | |
| 8,374,375 B2 | 2/2013 | Hu | | |
| 8,520,874 B1* | 8/2013 | Beutler | | H04R 25/00 381/313 |
| 8,582,755 B2* | 11/2013 | Bradford | | H04R 1/1058 379/420.01 |
| 2012/0314351 A1 | 12/2012 | Kroupa | | |
| 2013/0043243 A1 | 2/2013 | Shifferaw | | |
| 2013/0094687 A1* | 4/2013 | Weinstein | | H04R 1/10 381/334 |

* cited by examiner

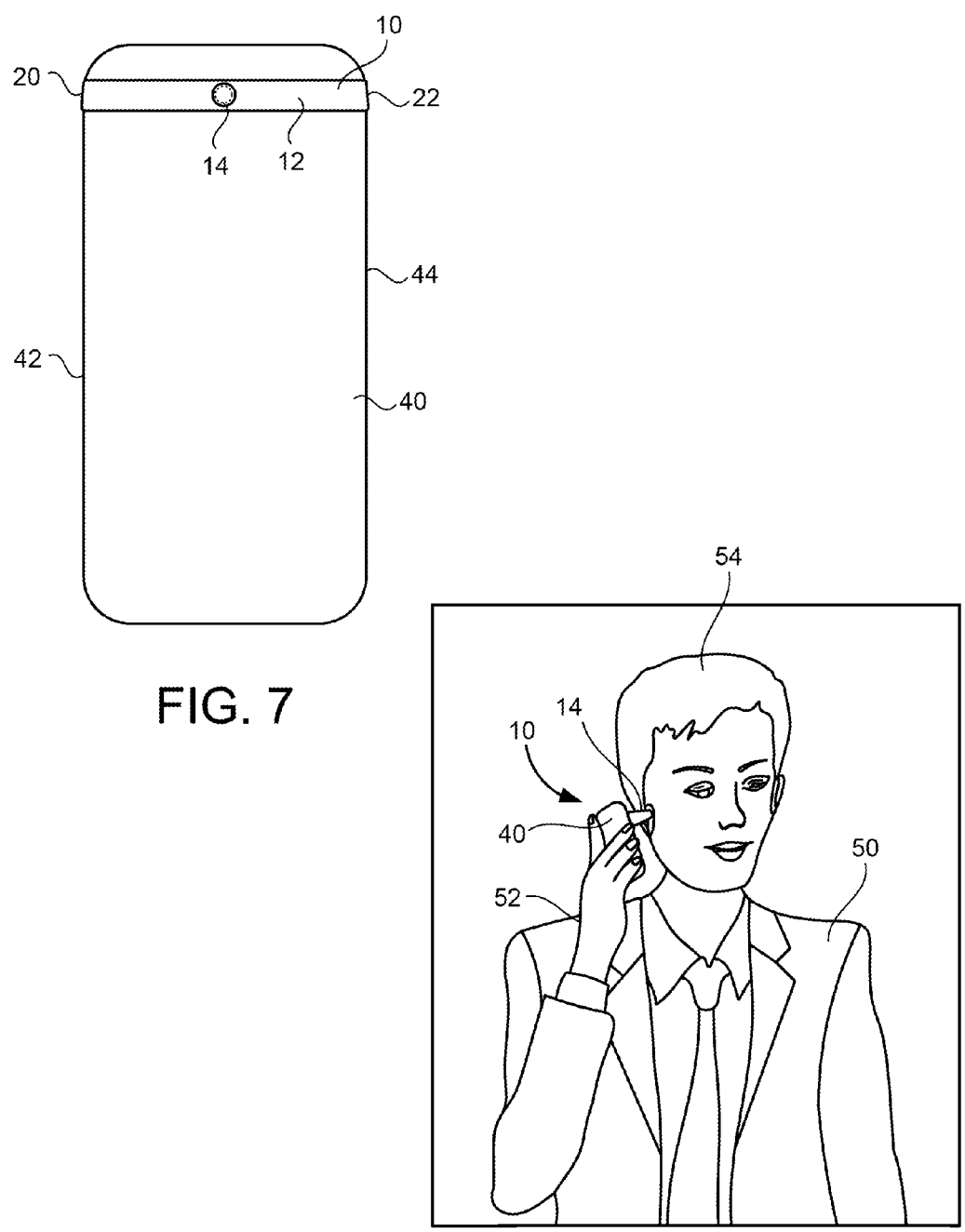

EARPIECE ATTACHMENT FOR USE WITH A CELL PHONE

RELATED U.S. APPLICATIONS

The present application claims priority from U.S. Provisional Patent Application Ser. No. 61/825,761, filed on May 21, 2013, and entitled "Earpiece Attachment for Use with a Cell Phone".

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to cell phones or mobile phones. More particularly, the present invention relates to earpiece attachments for use with such phones. Additionally, the present invention relates to extendable earpieces that serve to position the cell phone a desired distance from the user's head.

2. Description of Related Art Including Information Disclosed Under 37 CFR 1.97 and 37 CFR 1.98.

Since the advent of cell phones, there has been a concern about possible brain damage resulting from the electromagnetic radiation emanating from the cell phones. Although the level of electromagnetic radiation may be relatively low, the antenna emitting such radiation will reside quite close to the brain. As such, there is concern that the radiation can have a cumulative effect. This could potentially result in brain cancer or other damaging effects.

When some cell phone are used for just a few minutes, they heat up to such a degree that they cause discomfort to the ear against which they are held. The movement of the phone away from the ear can serve to relieve this problem. However, moving the phone away from the ear can make it more difficult to hear from the speaker of the phone. Additionally, the holding of the phone away from the ear can be uncomfortable since there is no support for the arm and hand that is holding the phone.

Many persons have difficulty centering the speaker of the phone adjacent to the ear canal. When the speaker of the phone is offset from the ear canal, even by a few millimeters, it can be more difficult to hear. This is especially true with elderly users. These elderly users often have little experience with cell phones and, as such, they may not properly position the phone for optimal use.

Many persons find it difficult to hear the speaker of the phone. As such, they attempt to press the speaker closer and closer to the ear in an attempt to hear better. Unfortunately, as the speaker is moved closer to the ear, any contact between the surfaces of the ear and the speaker can further limit the amount of sound that is emitted from the phone. As such, a need is developed so as to provide an earpiece which assures the proper centering of the earpiece on the ear canal and enhances the sound emanating from the phone.

In the past, various patent and patent applications have been published relating to earpieces for use with cell phones. For example, U.S. Pat. No. 5,298,692, issued on Mar. 29, 1994 to Ikeda et al., shows an earpiece for insertion into an ear canal as part of an earphone, an ear-mounted microphone, and earphone/microphone combination, or the like. The earpiece comprises a body part suitable for housing an earphone transducer and/or a solid vibration pickup, and a canal insert joined to the body part. The canal insert has a generally elongated shape with a rear portion joined directly to the body part. A front portion is located away from the body part. A midportion extends by which the rear and the front portions are joined together. The front portion and midportion of the canal insert have their cross sectional dimensions determined in a predefined relationship to fit as closely as feasible in the ear canals of a majority of people. The earpiece may be provided with a stabilizer, in the form of a contact piece or pieces, projecting laterally therefrom so as to provide for greater stability against dislodgement from the ear canal or rotational displacement therein.

U.S. Pat. No. 8,254,621, issued on Aug. 28, 2012 to Silvestri et al., discloses a positioning and retaining structure for an in-ear earpiece. An outer leg and an inner leg are attached to each other at an attachment end and attached to a body of the earpiece at the other end. The outer leg lies in a plane. The positioning and retaining structure have a stiffness that is greater when force is applied to the attachment end in a counterclockwise direction in the plane of the outer leg than when force is applied to the attachment end in a clockwise direction in the plane of the outer leg. The positioning and retaining structure positions an earpiece in a user's ear and retains the earpiece in its position.

U.S. Pat. No. 8,374,375, issued on Feb. 12, 2013 to Z. Hu, discloses an earphone device having a main body to be inserted in the outer ear of a user. A conchal wall stabilizer extends from the main body and is adapted to engage the conchal wall of the ear. The conchal wall stabilizer is able to assume different positions in relation to the main body. The conchal wall stabilizer is a bi-stable mechanism which is movable from a first stable position via a dead point to a second stable position. A spring means biases the conchal wall stabilizer towards the first stable position when the conchal wall stabilizer is positioned on a first side of the dead point. The spring biases the conchal wall stabilizer to a second stable position when the conchal wall stabailzer is positioned on a second side of the dead point.

U.S. Patent Publication No. 2012/0314351, published on Dec. 13, 2012 to R. Kroupa, discloses an extendable and retractable earpiece or audio headset cable assembly for mobile phone. This rear edge has an audio output port having a mount attached to a portion of the mobile device, such as the battery access door or panel. An earpiece cable reel housing is removably connected to the mount. The mount includes a flange having an outwardly extending rim. The reel housing includes a slot that receives and engages the rim of the flange to removably attach the reel housing to the mount.

U.S. Patent Publication No. 2013/0043243, published on Feb. 21, 2013 to T. D. Shifferaw, shows a cell phone cradle that keeps a cell phone away from the head when it is held up to the ear. The cradle has a first end with a height corresponding to the thickness of the cell phone and a second end with a height substantially greater than the thickness of the cell phone. Tapered sides form an enclosure having an open top and a depth which increases from one end to the other. The cell phone is placed in the cradle with the speaker in the deeper end so that the cell phone is spaced away from the head when the open side of the enclosure is held against the head with the speaker opposite the ear.

It is an object of the present invention to provide an earpiece for use with a cell phone that avoids the effects of electromagnetic radiation on the brain of the user.

It is an object of the present invention to provide an earpiece for use with a cell phone that keeps the cell phone a safe distance away from the head.

It is another object of the present invention to provide an earpiece for use with a cell phone that facilitates the ability to center the speaker with respect to the ear canal.

It is another object of the present invention to provide an earpiece for use with a cell phone which can be retracted for purposes of stowage and which can be extended for use.

It is another object of the present invention to provide an earpiece for use with a cell phone that enhances the sound quality emitted from the speaker of the cell phone.

It is still further object of the present invention to provide an earpiece for use with a cell phone which is easy to use, and relatively inexpensive.

These and other objects and advantages of the present invention will become apparent from a reading of the attached specification and appended claims.

BRIEF SUMMARY OF THE INVENTION

The present invention is an earpiece for use with a cell phone. The earpiece has a body that is suitable for attachment to the cell phone and a trumpet that is affixed to the body so as to be movable from a retracted position to an extended position. The trumpet includes a cover of a polymeric or elastomeric material and a resilient member that urges the trumpet outwardly from the body. A lock can be provided so as to retain the trumpet in a retracted position, as desired.

The body of the present invention is a panel having a first end and a second end. A spring-type clip is provided at each of the first and second ends of the panel. This spring clip is suitable for engaging the sides of a cell phone. The panel is form of a planar member that will extend across a face of the cell phone in proximity to the speaker of the phone. An opening is formed in the panel in a location between the first and second ends thereof. This opening corresponds to the location of the speaker of the cell phone.

The trumpet is affixed to the body so as to be movable from the retracted position to the extended position. The retracted position is closely aligned with the planar surface of the body. The extended position has an end extending outwardly of the body. The extended position is suitable for positioning in or adjacent to the ear canal. The trumpet will have a truncated conical configuration. This truncated conical configuration will narrow from the body so as to have a wide diameter at the body and a narrow diameter away from the body when the trumpet is in the extended position.

The cover can be formed of a polymeric or elastomeric material. The cover, in one form of the present invention, can have a bellows shape. The cover is resilient and has a acoustically-confining interior. The resilient member is positioned interior of the cover. The resilient member can be in the nature of a coil spring that urges the end of the cover outwardly away from the body. A lock is pivotably mounted to the body so as to retain the trumpet in the retracted position. Various lock mechanisms can be employed within the concept of the present invention so as to suitably retain the trumpet in its retracted position.

When the trumpet is extended, the end of the trumpet can fit comfortably within the end of the ear canal. As a result of this configuration, the speaker will be generally centered with relation to the ear canal. The acoustically-confining material of the interior of the cover will serve to focus the sound toward the ear canal and enhance the acoustic quality of the projected sound. The length of the trumpet is suitable for preventing any electromagnetic radiation from adversely affecting the user. When the trumpet is in its extended position, the safety is assured.

BRIEF DESCRIPTION OF THE SEVERAL VIEWS OF THE DRAWINGS

FIG. 7 is an illustration of the earpiece of the present invention as placed over the speaker of a common cell phone.

FIG. 8 is an illustration showing the use of the earpiece of the present invention.

DETAILED DESCRIPTION OF THE INVENTION

Figure 1:
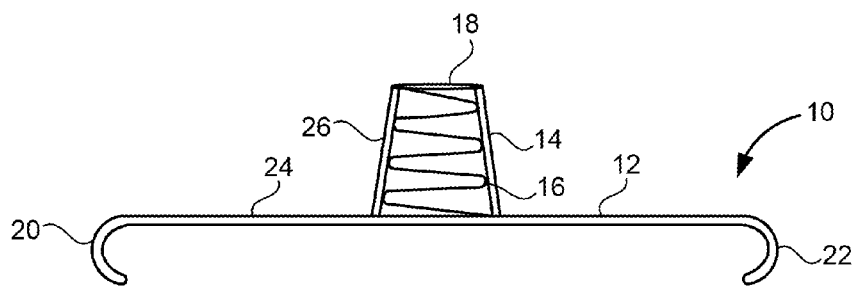
FIG. 1 is a plan view showing the earpiece of the present invention in an extended position.

Referring to FIG. 1, there is shown earpiece 10 for use in association with a cell phone in accordance with the preferred embodiment of the present invention. The earpiece 10 includes a body 12 and a trumpet 14. The body 12 is suitable for attachment to the cell phone 10. The trumpet 14 is affixed to the body and is shown, in FIG. 1, in an extended position away from the body. A resilient member 16 is located within the trumpet 14 so as to urge the trumpet 14 to is outwardly extending position. The trumpet 14 will have an end 18 positioned outwardly, in generally parallel planar relationship to the body 12. In the extended configuration, the trumpet 14 will have a truncated conical configuration.

The body 12 has a first end 20 and a second end 22. Each of the ends 20 and 22 is in the nature of a spring clip that is suitable for engaging the sides of a cell phone. The body 12 includes a planar member 24 extending between the first end 20 and the second end 22. The body 12 can be formed of a metallic material such that the spring clips at the ends 20 and 22 have suitable resiliency for engaging the sides of the cell phone.

The trumpet 14 has its narrow end 18 suitable for positioning in or adjacent to the ear canal of a user. The trumpet 14 has a wide diameter located adjacent to the body 12 and a narrow diameter at the end 18. The trumpet includes a cover 26 formed of a polymeric or elastomeric material. In particular, within the concept of the present invention, the cover 26 can have a bellows shape so as to facilitate the ability to expand outwardly or retract inwardly. The cover 26 should be formed of an acoustically-confining material. As such, sound transmitted from the speaker of the cell phone can be properly directed toward the end 18 of the cover 26. The resilient member 16 is in the nature of a coil spring that extends from the body 12 toward the end 18 of the trumpet 14.

Figure 2:
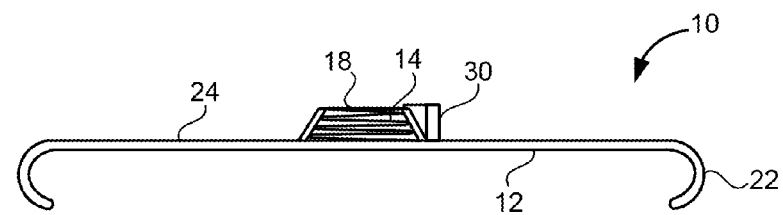
FIG. 2 is a plan view of the earpiece of the present invention showing the trumpet in a retracted position.

FIG. 2 shows the extended position earpiece 10 of the present invention with the trumpet 14 in a retracted position. In FIG. 2, the end 18 of the trumpet 14 is compressed so as to be adjacent to the planar member 24 of the body 12. A suitable lock 30 can be pivotally affixed to the body 12. As such, the lock 30 can have a ledge which overlies the end 18 of the trumpet 14 so as to retain the trumpet 14 in its retracted position. The arrangement shown in FIG. 2 is suitable for stowage when the cell phone is not use. When a call is received, the lock 30 can be released so as to cause the trumpet 14 to move to the extended position (as shown in FIG. 1). At this time, the earpiece 10 of the present invention is available for proper use.

Figure 3:
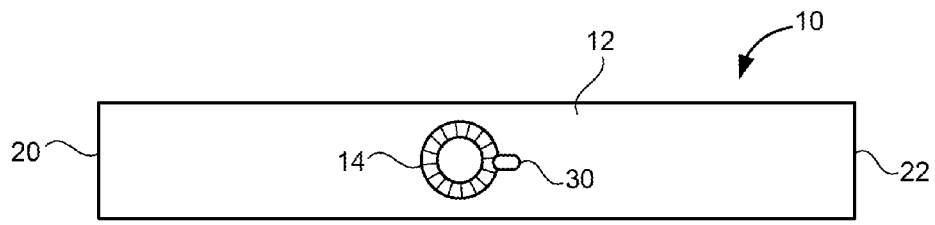
FIG. 3 is a frontal view showing the earpiece of the present invention.

FIG. 3 shows a frontal view of the earpiece 10 of the present invention. It can be seen that the body 12 is planar member having a first end 20 and a second end 22. The trumpet 14 is illustrated in its retracted position with the lock 30 retaining the trumpet 14 in its retracted position.

Figure 4:
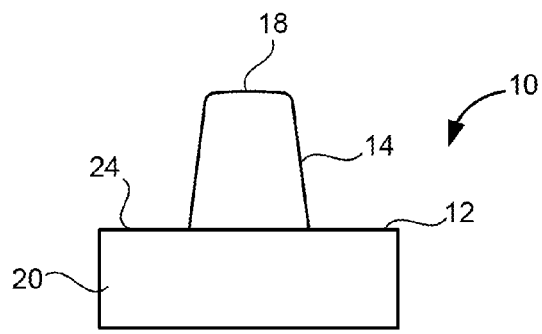
FIG. 4 is an end view of the earpiece of the present invention showing the trumpet in the extended position.

FIG. 4 shows an end view of the earpiece 10 of the present invention. In particular, the end 20 is suitably curved so as to overlap or wrap around the outer edges of the cell phone. The trumpet 14 extends outwardly from the planar surface 24 of the body 12 so as to assume a generally truncated conical configuration. As a result, the narrow end 18 of the trumpet 14 can be placed adjacent to or in the ear canal of a user.

Figure 5:
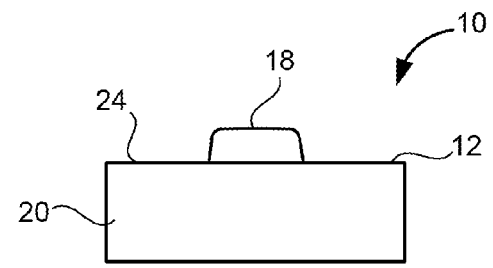
FIG. 5 is an end view of the earpiece of the present invention showing the trumpet in the retracted position.

FIG. 5 shows the trumpet 18 as viewed from the end 20 of the earpiece 10. Once again, it can be seen that the trumpet 18 has a retracted configuration such that the end 18 is generally adjacent to the planar surface 24 of the body 12.

Figure 6:
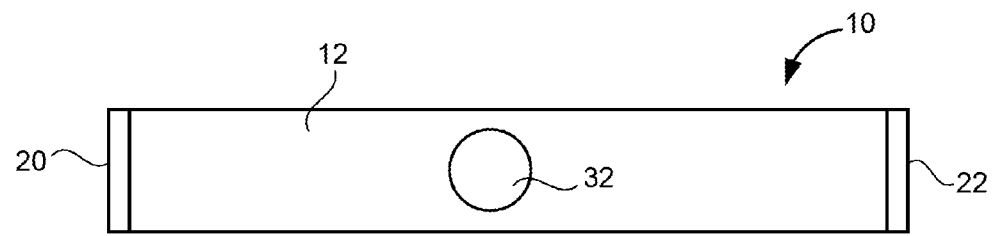
FIG. 6 is an interior side elevational view of the earpiece of the present invention.

FIG. 6 shows an inner view of the earpiece 10 of the present invention. In particular, there is an opening 32 formed centrally of the body 12. Opening 32 will be in a location corresponding to the location of the speaker of the cell phone. The end 20 has a spring-type clip thereat. Similarly, end 22 also has a spring-type clip at the end thereof.

FIG. 7 illustrates the use of the earpiece 10 of the present invention as applied to a cell phone 40. The cell phone 40 is illustrated in the form of an IPHONE™. The cell phone 40 has sides 42 and 44. The body 12 of the earpiece 10 has its ends 20 and 22 clipped over the respective sides 42 and 44. As a result, the trumpet 14 will be properly centered over the speaker of the cell phone 40.

FIG. 8 shows the actual use of the earpiece 10 of the present invention. In FIG. 8, it can be seen that a user 50 has the cell phone 40 held by the hand 52. The trumpet 14 extends outwardly of the body 12 so as to be positioned in the ear. When the trumpet 14 is in its extended position, the body of the cell phone 40 is maintained a safe distance away from the head 54 of the user. Additionally, the narrow end 18 of the trumpet 14 allows the user to properly locate the speaker with respect to the ear canal. As such, misplacement of the speaker is effectively avoided. The configuration of the trumpet 14 will tend to enhance the acoustic qualities of sound emanating from the speaker so that the user 50 is able to more clearly hear sound emanating from the speaker.

The foregoing disclosure and description of the invention is illustrative and explanatory thereof. Various changes in the details of the described method can be made with the scope of the appended claims without departing from the true spirit of the invention. The present invention should only be limited by the following claims and their legal equivalents.

I claim:

1. An earpiece attachment for use with a cell phone, the earpiece attachment comprising:
   a body having a first end and a second end, said first and second ends suitable for engaging a surface of the cell phone, said body having a length suitable for extending across a width of the cell phone, said body having a hole therein, said hole suitable for corresponding in location to a speaker of the cell phone;
   a trumpet affixed to said body in a location over said hole of said body, said trumpet movable between a retracted position and an extended position, the extended position suitable for extending into or adjacent to an ear canal of a user of the cell phone, each of said first end and said second end of said body having a spring-loaded clip, the spring-loaded clips suitable for engaging respective sides of the cell phone.

2. The earpiece attachment of claim 1, said body having a panel positioned between said first end and said second end, said panel suitable for extending across a face of the cell phone.

3. The earpiece attachment of claim 1, said retracted position of said trumpet been aligned with a planar surface of said body.

4. The earpiece attachment of claim 1, said trumpet being formed of a polymeric material or an elastomeric material.

5. The earpiece attachment of claim 1, further comprising:
   a resilient member fitted within said trumpet, said resilient member urging said trumpet toward said extended position.

6. The earpiece attachment of claim 5, said resilient member being a coil spring positioned within said trumpet.

7. The earpiece attachment of claim 1, said trumpet having a frustoconical configuration when in said extended position, said trumpet having a wide end at said body and a narrow end away from said body.

8. The earpiece attachment of claim 1, said trumpet having a bellows shape with an acoustically-confining interior wall.

9. The earpiece attachment of claim 1, further comprising:
   a lock affixed to said body, said lock suitable for maintaining said trumpet in said retracted position.

10. The earpiece attachment of claim 9, said lock being pivotally mounted to said body, said lock being rotatable between a first position locking said trumpet in said retracted position and a second position releasing said trumpet such that said trumpet moves to the extended position.

11. The earpiece attachment of claim 10, said lock being an L-shape member having a portion overlying said trumpet when said trumpet is in said retracted position.

12. An earpiece attachment for use with a cell phone, the earpiece attachment comprising:
   a body having a first end and a second end, said first and second ends suitable for engaging a surface of the cell phone, said body having a length suitable for extending across a width of the cell phone, said body having a hole therein, said hole suitable for corresponding in location to a speaker of the cell phone;
   a trumpet affixed to said body in a location over said hole of said body, said trumpet movable between a retracted position and an extended position, the extended position suitable for extending into or adjacent to an ear canal of a user of the cell phone; and
   a lock affixed to said body, said lock suitable for maintaining said trumpet in said retracted position.

13. The earpiece attachment of claim 12, said body having a panel positioned between said first end and said second end, said panel suitable for extending across a face of the cell phone, each of said first end and said second end of said body having a spring-loaded clip, the spring-loaded clips being suitable for engaging respective sides of the cell phone.

14. The earpiece attachment of claim 12, further comprising:
   a resilient member fitted within said trumpet, said resilient member urging said trumpet toward said extended position.

15. The earpiece attachment of claim 12, said lock being pivotally mounted to said body, said lock being rotatable between a first position locking said trumpet in said retracted position and a second position releasing said trumpet such that said trumpet moves to the extended position.

16. The earpiece attachment of claim 15, said lock being an L-shape member having a portion overlying said trumpet when said trumpet is in said retracted position.

17. An earpiece attachment for use with a cell phone, the earpiece attachment comprising:
- a body having a first end and a second end, said first and second ends suitable for engaging a surface of the cell phone, said body having a length suitable for extending across a width of the cell phone, said body having a hole therein, said hole suitable for corresponding in location to a speaker of the cell phone;
- a trumpet affixed to said body in a location over said hole of said body, said trumpet movable between a retracted positioned and an extended position, the extended position suitable for extending into or adjacent to an ear canal of a user of the cell phone; and
- a resilient member fitted within said trumpet, said resilient member urging said trumpet toward said extended position.

18. The earpiece attachment of claim 17, further comprising:
- a lock affixed to said body, said lock suitable for maintaining said trumpet in said retracted position.

19. The earpiece attachment of claim 17, said resilient member being a coil spring positioned within said trumpet, said trumpet having a frustoconical configuration when in said extended position, said trumpet having a wide end at said body and a narrow end away from said body.

\* \* \* \* \*